(12) United States Patent
Hu et al.

(10) Patent No.: US 11,614,645 B2
(45) Date of Patent: Mar. 28, 2023

(54) DIMMING GLASS AND MANUFACTURING METHOD THEREOF, DIMMING GLASS SYSTEM AND DRIVING METHOD THEREOF

(71) Applicants: Beijing BOE Sensor Technology Co., Ltd., Beijing (CN); BOE TECHNOLOGY GROUP CO., LTD., Beijing (CN)

(72) Inventors: Zhong Hu, Beijing (CN); Chen Meng, Beijing (CN); Yongbo Wang, Beijing (CN); Yutao Tang, Beijing (CN); Wei Shi, Beijing (CN); Binbin Liu, Beijing (CN); Jiarong Liu, Beijing (CN); Dahai Hu, Beijing (CN); Wenjie Zhong, Beijing (CN)

(73) Assignees: BEIJING BOE SENSOR TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/259,353

(22) PCT Filed: Mar. 6, 2020

(86) PCT No.: PCT/CN2020/078247
§ 371 (c)(1),
(2) Date: Jan. 11, 2021

(87) PCT Pub. No.: WO2021/174540
PCT Pub. Date: Sep. 10, 2021

(65) Prior Publication Data
US 2022/0137443 A1    May 5, 2022

(51) Int. Cl.
*G02F 1/133* (2006.01)

(52) U.S. Cl.
CPC ................. *G02F 1/13306* (2013.01)

(58) Field of Classification Search
None
See application file for complete search history.

(56) References Cited

U.S. PATENT DOCUMENTS

| | | | | |
|---|---|---|---|---|
| 6,320,568 B1* | 11/2001 | Zavracky | ........... | G02B 27/0172 257/E29.295 |
| 6,513,972 B1* | 2/2003 | Jenkins | .............. | G01K 11/3206 374/161 |

(Continued)

FOREIGN PATENT DOCUMENTS

| CN | 202362552 | 8/2012 |
|---|---|---|
| CN | 105223722 | 1/2016 |
| CN | 107065268 | 8/2017 |

OTHER PUBLICATIONS

PCT International Search Report for corresponding PCT Application No. PCT/CN2020/078247, dated Dec. 16, 2020, 9 pages.

*Primary Examiner* — Ryan Crockett
(74) *Attorney, Agent, or Firm* — Dority & Manning, P.A.

(57) ABSTRACT

A dimming glass includes: a first base substrate and a second base substrate that are oppositely disposed, a dye liquid crystal layer disposed between the first base substrate and the second base substrate, and at least one temperature sensor disposed between the first base substrate and the second base substrate. The at least one temperature sensor is configured to detect a temperature of the dye liquid crystal layer.

8 Claims, 6 Drawing Sheets

(56) References Cited

U.S. PATENT DOCUMENTS

| | | | |
|---|---|---|---|
| 2002/0135711 A1* | 9/2002 | Mori | G02F 1/133382 349/58 |
| 2005/0068629 A1* | 3/2005 | Fernando | E06B 9/24 359/609 |
| 2007/0218217 A1* | 9/2007 | Fernando | G02F 1/133305 428/1.31 |
| 2008/0147270 A1* | 6/2008 | Sakane | B60H 1/00864 700/300 |
| 2008/0158448 A1* | 7/2008 | Fernando | B32B 17/10036 349/16 |
| 2009/0057924 A1* | 3/2009 | Imai | H01L 24/83 257/784 |
| 2009/0167971 A1* | 7/2009 | Powers | E06B 9/24 349/18 |
| 2009/0251397 A1 | 10/2009 | Dunn | |
| 2010/0045913 A1 | 2/2010 | Liu et al. | |
| 2012/0154706 A1* | 6/2012 | Cho | G09G 3/3648 349/72 |
| 2013/0010347 A1* | 1/2013 | Tajima | C03C 17/36 359/267 |
| 2015/0183481 A1* | 7/2015 | Tetsuka | G02F 1/1336 180/219 |
| 2016/0291396 A1* | 10/2016 | Xie | G02F 1/133382 |
| 2017/0090240 A1 | 3/2017 | Liu et al. | |
| 2019/0049785 A1* | 2/2019 | Cho | G02F 1/133382 |
| 2021/0048860 A1* | 2/2021 | Jinta | G09G 3/3648 |
| 2021/0206241 A1* | 7/2021 | Guo | G02F 1/1313 |
| 2021/0405496 A1* | 12/2021 | Ma | G02F 1/1685 |

\* cited by examiner

DIMMING GLASS AND MANUFACTURING METHOD THEREOF, DIMMING GLASS SYSTEM AND DRIVING METHOD THEREOF

CROSS-REFERENCE TO RELATED APPLICATION

This application is a national phase entry under 35 USC 371 of International Patent Application No. PCT/CN2020/078247 filed on Mar. 6, 2020, which is incorporated herein by reference in its entirety.

TECHNICAL FIELD

The present disclosure relates to the field of glass technologies, and in particular, to a dimming glass and a manufacturing method thereof, a dimming glass system and a driving method thereof.

BACKGROUND

Dimming glass is a kind of glass whose light transmittance may be changed (i.e., which is gradually changed between a transparent state and an opaque state) by means of electric control, temperature control, light control, or pressure control.

SUMMARY

In an aspect, a dimming glass is provided. The dimming glass includes: a first base substrate and a second base substrate that are oppositely disposed, a dye liquid crystal layer disposed between the first base substrate and the second base substrate, and at least one temperature sensor disposed between the first base substrate and the second base substrate. The at least one temperature sensor is configured to detect a temperature of the dye liquid crystal layer.

In some embodiments, the at least one temperature sensor is disposed on a side of the first base substrate proximate to the second base substrate, and/or the at least one temperature sensor is disposed on a side of the second base substrate proximate to the first base substrate.

In some embodiments, the dimming glass has a main region and an edge region located at at least one side of the main region. The dye liquid crystal layer is located in the main region, and the at least one temperature sensor is located in the edge region of the dimming glass.

In some embodiments, the at least one temperature sensor includes at least one of a positive temperature coefficient thermistor and a negative temperature coefficient thermistor.

In some embodiments, each temperature sensor includes: a conductive body disposed on the first base substrate or the second base substrate, a sensing electrode electrically connected to the conductive body, and a protective layer covering the conductive body and the sensing electrode. A material of the conductive body includes a thermosensitive material.

In some embodiments, the dimming glass includes: a first dimming electrode disposed on a side of the first base substrate, a first alignment film disposed on a side of the first dimming electrode away from the first base substrate, a second dimming electrode disposed on a side of the second base substrate proximate to the first base substrate, and a second alignment film disposed on a side of the second dimming electrode proximate to the first base substrate.

In some embodiments, each temperature sensor includes a sensing electrode, and a material of the sensing electrode, a material of the first dimming electrode and a material of the second dimming electrode all include a transparent conductive material.

In some embodiments, in a case where a temperature sensor is disposed on the first base substrate and the temperature sensor includes a sensing electrode, the sensing electrode and the first dimming electrode are made of a same material and are disposed in a same layer. In a case where the temperature sensor is disposed on the second base substrate and the temperature sensor includes the sensing electrode, the sensing electrode and the second dimming electrode are made of a same material and are disposed in a same layer.

In some embodiments, the dimming glass further includes a sealant disposed between the first base substrate and the second base substrate. The sealant surrounds the dye liquid crystal layer, and at least a part of the sealant is located between the dye liquid crystal layer and the at least one temperature sensor.

In another aspect, a method of manufacturing a dimming glass is provided. The method includes: providing a first base substrate and a second base substrate; forming at least one temperature sensor on the first base substrate and/or the second base substrate; and forming a dye liquid crystal layer between the first base substrate and the second base substrate. The at least one temperature sensor is located between the first base substrate and the second base substrate, and the at least one temperature sensor is configured to detect a temperature of the dye liquid crystal layer.

In some embodiments, each temperature sensor includes: a conductive body, a sensing electrode electrically connected to the conductive body, and a protective layer covering the conductive body and the sensing electrode. Forming the at least one temperature sensor includes: forming a first conductive thin film on the first base substrate or the second base substrate; patterning the first conductive thin film to form the conductive body; forming a second conductive thin film at a side of the conductive body away from the first base substrate; patterning the second conductive thin film to form the sensing electrode; and forming a protective layer on a side of the conductive body and the sensing electrode away from the first base substrate.

In some embodiments, the dimming glass includes a first dimming electrode disposed on a side of the first base substrate, and a second dimming electrode disposed on a side of the second base substrate proximate to the first base substrate. In a case where the temperature sensor is disposed on the first base substrate, when the second conductive thin film is patterned to form the sensing electrode, the first dimming electrode is formed synchronously. In a case where the temperature sensor is disposed on the second base substrate, when the second conductive thin film is patterned to form the sensing electrode, the second dimming electrode is formed synchronously.

In some embodiments, the method further includes: forming a sealant between the first base substrate and the second base substrate. The sealant surrounds the dye liquid crystal layer, and at least a part of the sealant is located between the dye liquid crystal layer and the at least one temperature sensor.

In yet another aspect, a dimming glass system is provided. The dimming glass system includes the dimming glass according to some embodiments described above, and a controller electrically connected to the at least one temperature sensor in the dimming glass. The controller is configured to control the at least one temperature sensor to detect the temperature of the dye liquid crystal layer in the dimming glass, obtain a detection signal of the at least one temperature sensor, and transmit driving voltages for controlling the dye liquid crystal layer to the dimming glass according to the detection signal.

In yet another aspect, a method of driving a dimming glass system is provided. The method is applied to the dimming glass system according to some embodiments described above. The method includes: controlling, by the controller, the at least one temperature sensor in the dimming glass to work; detecting, by the at least one temperature sensor, the temperature of the dye liquid crystal layer in the dimming glass, generating, by the at least one temperature sensor, the detection signal, and transmitting, by the at least one temperature sensor, the detection signal to the controller; and obtaining, by the controller, the temperature of the dye liquid crystal layer according to the detection signal, and adjusting, by the controller, the driving voltages for controlling the dye liquid crystal layer according to the temperature of the dye liquid crystal layer.

In some embodiments, adjusting, by the controller, the driving voltages for controlling the dye liquid crystal layer according to the temperature of the dye liquid crystal layer includes: adjusting values of the driving voltages, and/or adjusting frequencies of the driving voltages.

BRIEF DESCRIPTION OF THE DRAWINGS

In order to describe technical solutions in the present disclosure more clearly, accompanying drawings to be used in some embodiments of the present disclosure will be introduced below briefly. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products and actual processes of methods that the embodiments of the present disclosure relate to.

DETAILED DESCRIPTION

Figure 1:
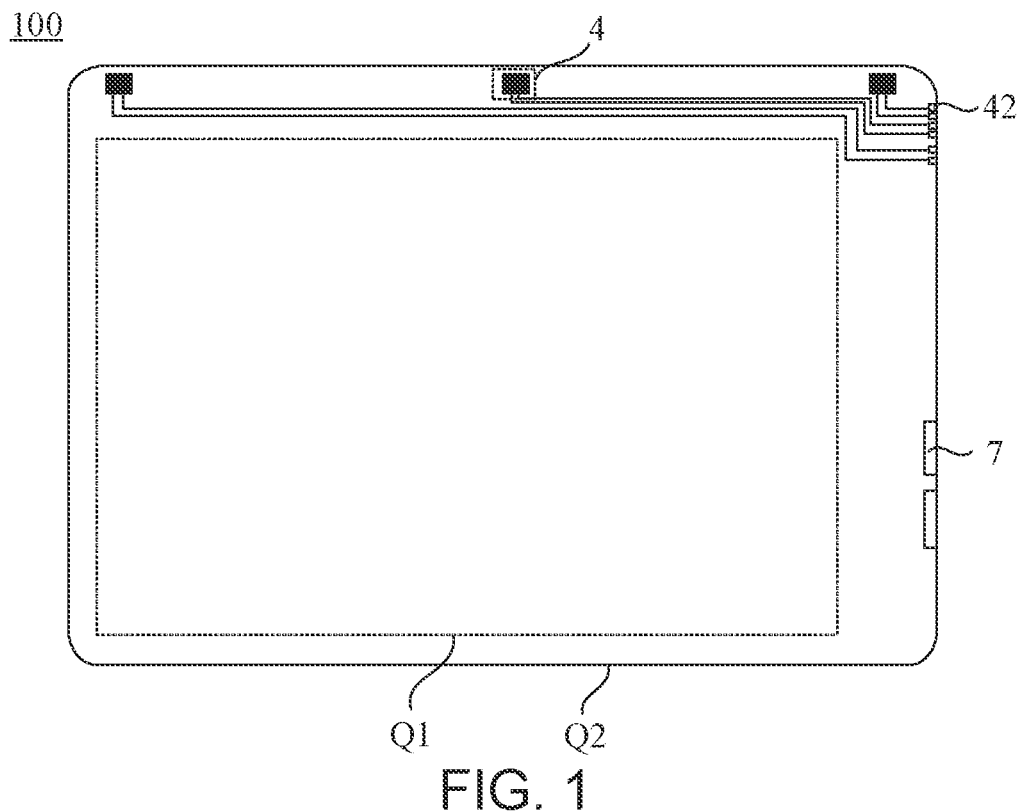
FIG. 1 is a diagram showing a structure of a dimming glass, in accordance with some embodiments of the present disclosure.

Technical solutions in some embodiments of the present disclosure will be described below clearly and completely in combination with the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as open and inclusive, i.e., "including, but not limited to". In the description, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a plurality of/the plurality of/multiple" means two or more unless otherwise specified.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

In the related art, electronically controlled dimming glass is widely used. The dimming glass usually includes two substrates disposed opposite to each other, and a liquid crystal layer disposed between the two substrates. In this way, by controlling driving voltages applied to both sides of the liquid crystal layer, a deflection state of liquid crystal molecules in the liquid crystal layer may be controlled, thereby controlling a light transmittance of the dimming glass (i.e., the dimming glass being gradually changed between a transparent state and an opaque state).

The dimming glass includes a dimming glass in a normal white mode. That is, in a case where no driving voltages are applied to the dimming glass, the dimming glass is in the transparent state (i.e., the light transmittance being 100% or approximately 100%). As values of the driving voltages increase, the light transmittance of the dimming glass gradually decreases, and the dimming glass changes from the transparent state to the opaque state (i.e., the light transmittance being 0 or approximately 0).

However, the liquid crystal molecules in the liquid crystal layer are easily affected by temperature. For example, in a case where the temperature is high, an activity of the liquid crystal molecules increases. In a case where the same driving voltages are provided, a deflection angle of liquid crystal molecules at a high temperature is greater than a deflection angle of liquid crystal molecules at a low temperature, so that a light transmittance of the dimming glass in an environment with a high temperature is greater than a light transmittance of the dimming glass in an environment with a low temperature. As a result, in the dimming glass, in a case where temperatures of liquid crystal molecules at different positions are different, and the driving voltages are driving voltages corresponding to the opaque state, a light transmittance at a position with a high temperature increases, and a bright spot appears, so that an undesirable non-uniformity phenomenon of the dimming glass occurs.

Figure 9:
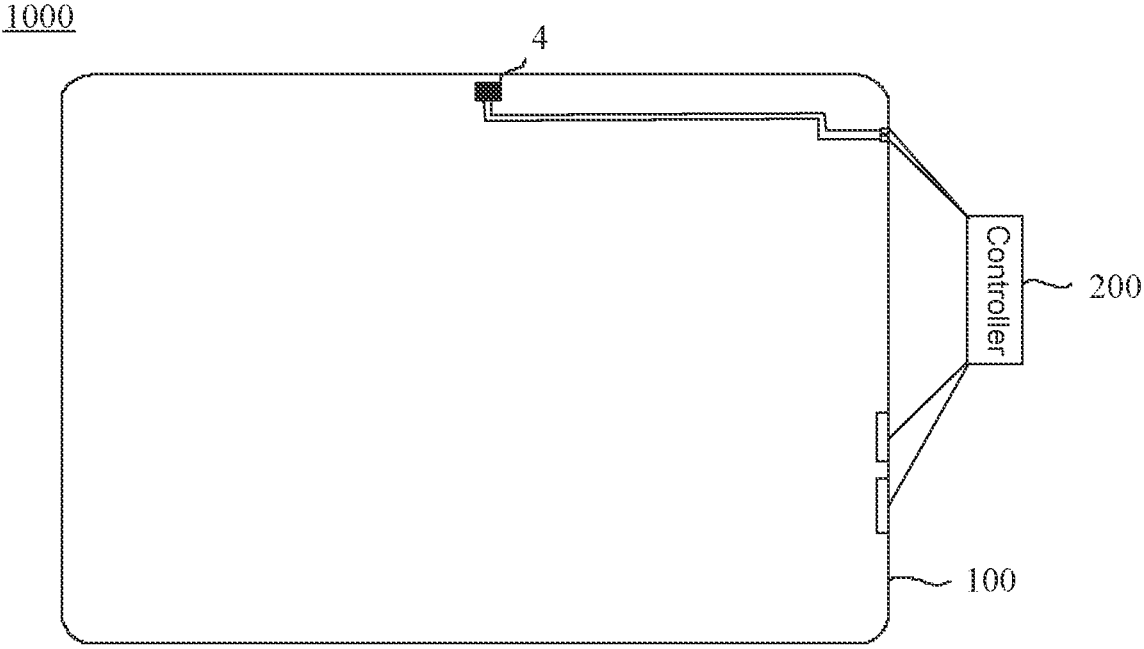
FIG. 9 is a diagram showing a structure of a dimming glass system, in accordance with some embodiments of the present disclosure.

On this basis, some embodiments of the present disclosure provide a dimming glass system 1000. As shown in FIG. 9, the dimming glass system includes a dimming glass 100 and a controller 200.

Figure 4:
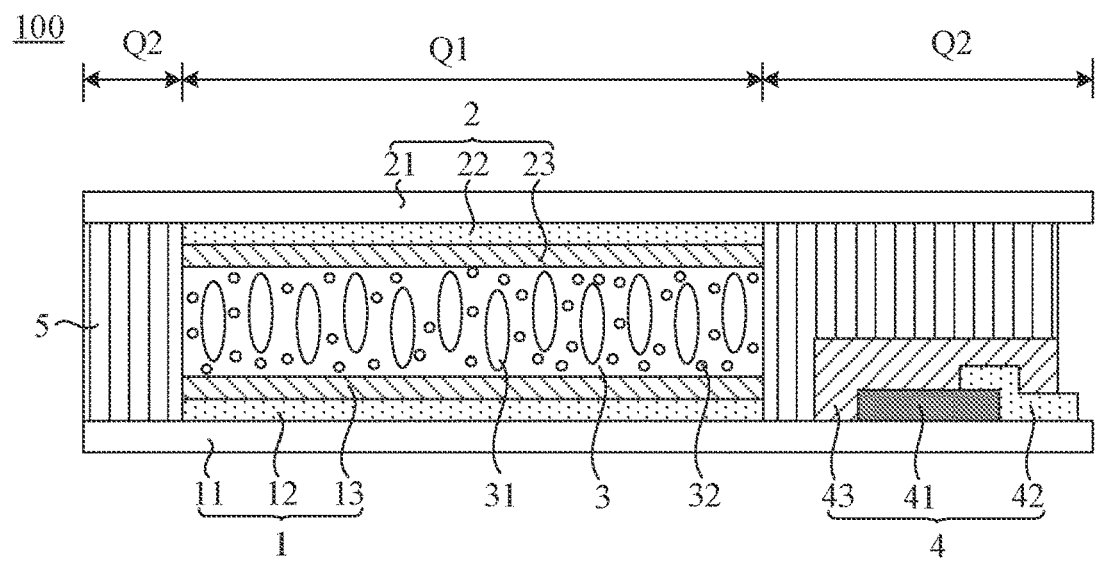
FIG. 4 is a sectional view of the dimming glass taken along direction A-A' as shown in FIG. 2.
Figure 5:
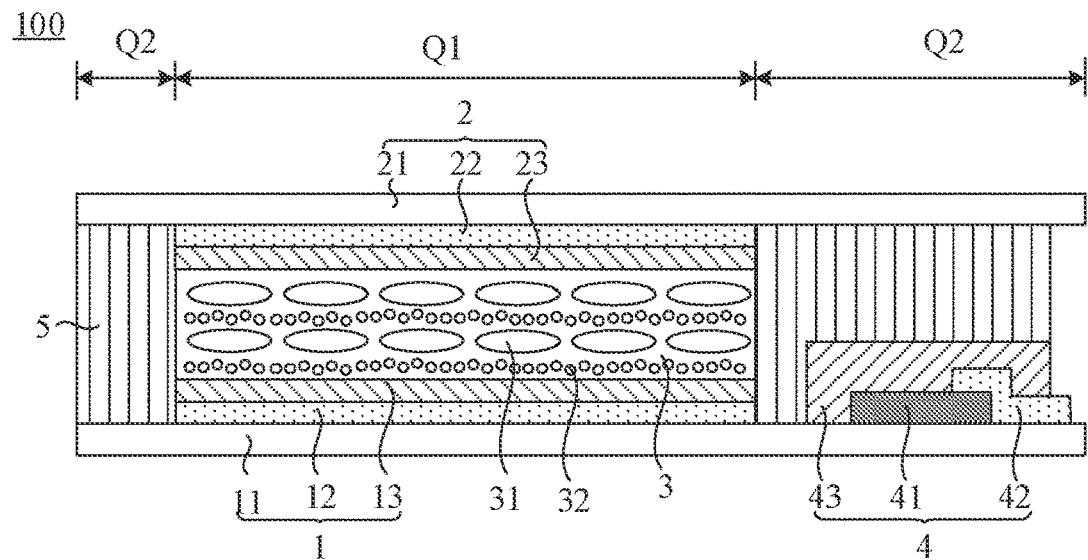
FIG. 5 is another sectional view of the dimming glass taken along the direction A-A' as shown in FIG. 2.

In some embodiments, as shown in FIGS. 4 and 5, the dimming glass 100 includes a dye liquid crystal layer 3 and at least one temperature sensor 4. The at least one temperature sensor 4 is configured to detect a temperature of the dye liquid crystal layer 3.

As shown in FIG. 9, the controller 200 is electrically connected to the at least one temperature sensor 4 in the dimming glass 100, and is configured to control the at least one temperature sensor 4 to detect the temperature of the dye liquid crystal layer 3 in the dimming glass 10, obtain a detection signal of the at least one temperature sensor 4, and transmit driving voltages for controlling the dye liquid crystal layer 3 to the dimming glass 100 according to the detection signal.

That the controller 200 transmits the driving voltages for controlling the dye liquid crystal layer 3 to the dimming glass 100 according to the detection signal will be schematically described below.

In some examples, in a working process of the dimming glass 100, the controller 200 transmits the driving voltages to the dimming glass 100 to control a deflection state of liquid crystal molecules in the dye liquid crystal layer 3 and control a light transmittance of the dimming glass 100. Moreover, the controller 200 may control the at least one temperature sensor 4 to detect the temperature of the dye liquid crystal layer 3 in real time. After the controller 200 obtains the detection signal of the at least one temperature sensor 4 (a signal corresponding to the temperature of the dye liquid crystal layer 3), the controller 200 may adjust the driving voltages transmitted to the dye liquid crystal layer 3 according to a mapping table of the temperature and the driving voltages. In this way, deflection states of the liquid crystal molecules at different positions of the dye liquid crystal layer 3 may be more ideal deflection states, and light transmittances at different positions of the dimming glass 100 are more ideal light transmittances, thereby weakening or even eliminating the undesirable non-uniformity phenomenon of the dimming glass 100.

A structure of the dimming glass system 1000 provided by some embodiments of the present disclosure will be schematically described below with reference to the accompanying drawings.

Figure 2:
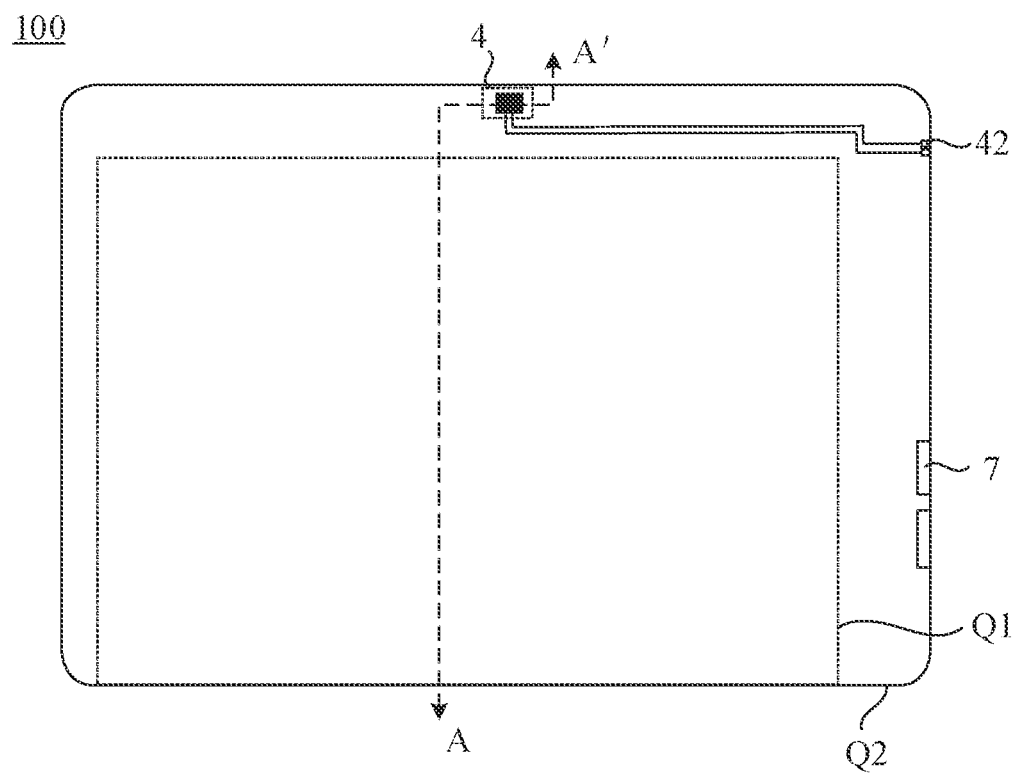
FIG. 2 is a diagram showing a structure of another dimming glass, in accordance with some embodiments of the present disclosure.

As shown in FIGS. 1 and 2, some embodiments of the present disclosure provide a dimming glass 100. As shown in FIGS. 4 and 5, the dimming glass 100 includes a first substrate 1 and a second substrate 2 that are oppositely disposed.

As shown in FIGS. 4 and 5, the first substrate 1 includes a first base substrate 11, a first dimming electrode 12 disposed on a side of the first base substrate 11, and a first alignment film 13 disposed on a side of the first dimming electrode 12 away from the first base substrate 11. The second substrate 2 includes a second base substrate 21, a second dimming electrode 22 disposed on a side of the second base substrate 21 proximate to the first substrate 1, and a second alignment film 23 disposed on a side of the second dimming electrode 22 proximate to the first substrate 1.

In some examples, a type of the first base substrate 11 may be the same as or different from a type of the second base substrate 21, as long as light may pass through the first base substrate 11 and the second base substrate 21. For example, the first base substrate 11 and the second base substrate 21 may be light-transmissive glass base substrates. In this way, in a case where the dimming glass 100 is in the transparent state, it may be ensured that the dimming glass 100 has a good light transmittance.

In some examples, a material of the first dimming electrode 12 and a material of the second dimming electrode 22 may be the same or different, as long as the first dimming electrode 12 and the second dimming electrode 22 can transmit light. For example, the material of the first dimming electrode 12 and the material of the second dimming electrode 22 are the same, and the material includes a transparent conductive material, such as indium tin oxide (ITO) or indium zinc oxide (IZO). Herein, ITO or IZO is a conductive material with a high light transmittance. In this way, in the case where the dimming glass 100 is in the transparent state, it may be ensured that the dimming glass 100 has a good light transmittance, and it is possible to prevent the first dimming electrode 12 and the second dimming electrode 22 from adversely affecting the light transmittance of the dimming glass 100.

In some examples, a material of the first alignment film 13 and a material of the second alignment film 23 may be the same or different, as long as the first alignment film 13 and the second alignment film 23 can transmit light. For example, the material of the first alignment film 13 and the material of the second alignment film 23 are the same; the material may be a mixture of polyimide, N-methyl pyrrolidone and 2-butoxy ethanol; or the material may be a polymer of hydroxyethyl acrylate, 3-isocyanatomethylene-3, 5,5-trimethylcyclohexyl isocyanate, bisphenol propane or 1,4-cyclohexanediol. In this way, in a case where the dimming glass 100 is in the transparent state, it may be ensured that the dimming glass 100 has a good light transmittance.

In some embodiments, as shown in FIGS. 4 and 5, the dimming glass 100 further includes the dye liquid crystal layer 3. The dye liquid crystal layer 3 is disposed between the first substrate 1 and the second substrate 2, as well as the dye liquid crystal layer 3 is disposed between the first alignment film 13 and the second alignment film 23.

The dye liquid crystal layer 3 includes liquid crystal molecules 31 and light-absorbing ions 32 capable of absorbing light. In the dye liquid crystal layer 3, a molecular axis of the light-absorbing ion 32 is substantially parallel to a long axis of the liquid crystal molecule 31. In a case where the liquid crystal molecule 31 rotates, the light-absorbing ion 32 rotates in phase with the liquid crystal molecule 31 under action of a force among the liquid crystal molecules. In a case where a rotation angle of the light-absorbing ions 32 is different, a light-absorbing rate thereof is different, and a light-blocking effect thereof is different.

Herein, in a case where the controller 200 transmits the driving voltages to control the dye liquid crystal layer 3, the driving voltages are transmitted to the first dimming electrode 12 and the second dimming electrode 22 to control the dye liquid crystal layer 3.

In some examples, as shown in FIGS. 1 and 2, the dimming glass 100 further includes electrode leads 7 that are disposed between the first substrate 1 and the second substrate 2 and are electrically connected to the first dimming electrode 12 and the second dimming electrode 22, respectively. The controller 200 may be electrically connected to the electrode leads 7, and transmits the driving voltages to the first dimming electrode 12 and the second dimming electrode 22 through the electrode leads 7.

A working principle of the dimming glass 100 will be schematically described below. For example, the dimming glass 100 is a dimming glass in a normal white mode.

In a case where no driving voltages are transmitted to the dye liquid crystal layer 3, as shown in FIG. 4, the long axes of the liquid crystal molecules 31 in the dye liquid crystal layer 3 and the molecular axes of the light-absorbing ions 32 are both perpendicular to the first alignment film 13 (or the second alignment film 23), and the light-absorbing ions 32 are randomly dispersed between the first alignment film 13 and the second alignment film 23. In this case, when light is directed to the dimming glass 100, the light-absorbing ions 32 substantially do not absorb the light, so that the light may completely pass through the dimming glass 100 (i.e., the light transmittance of the dimming glass 100 being 100% or approximately 100%), and the dimmer glass 100 is in the transparent state.

In a case where the driving voltages are applied to the dye liquid crystal layer 3, as shown in FIG. 5, the driving voltages are transmitted to the first dimming electrode 12 and the second dimming electrode 22 (e.g., a voltage transmitted to the first dimming electrode 12 being a positive voltage, and a voltage transmitted to the second dimming electrode 22 being a negative voltage). An electric field is generated between the first dimming electrode 12 and the second dimming electrode 22. The liquid crystal molecules 31 rotate under action of the electric field, and the light-absorbing ions 32 rotate with the deflection of the liquid crystal molecules 31. For example, the liquid crystal molecules 31 rotate to a state where the long axes of the liquid crystal molecules 31 are parallel to an extending direction of the first alignment film 13 (or the second alignment film 23), and control the light-absorbing ions 32 to rotate to a state where the molecular axes of the light-absorbing ions 32 are parallel to the extending direction of the first alignment film 13 (or the second alignment film 23), so that the light-absorbing ions 32 has a layered structure. In this case, when the light is directed to the dimming glass 100, the light-absorbing ions 32 may completely absorb the light, so that it is difficult for the light to pass through the dimming glass 100 (i.e., the light transmittance of the dimming glass 100 being 0 or approximately 0), and the dimming glass 100 is in the opaque state.

It will be noted that, since in the case where no driving voltages are transmitted to the dye liquid crystal layer 3, the long axes of the liquid crystal molecules 31 are perpendicular to the first alignment film 13, it is possible to avoid performing rubbing alignment to the first alignment film 13 and the second alignment film 23, which is beneficial to simplifying a manufacturing process of the dimming glass 100. Of course, the embodiments of the present disclosure are not limited to the dimming glass 100 in the above mode.

In some examples, as shown in FIGS. 1 and 2, the dimming glass 100 further includes at least one temperature sensor 4. That is, the dimming glass 100 may include one temperature sensor 4 (e.g., shown in FIG. 2), or may include a plurality of temperature sensors 4 (e.g., shown in FIG. 1). Herein, the number of the temperature sensors 4 may be selected and set according to actual needs.

For example, in a case where a size of the dimming glass 100 is small, there may be fewer temperature sensors 4 (e.g., one or two).

For another example, in a case where the size of the dimming glass 100 is large, there may be more temperature sensors 4 (e.g., four or five). In this way, temperatures at multiple positions of the dye liquid crystal layer 3 may be detected by using a plurality of temperature sensors 4, which is beneficial to improving accuracy of a temperature detection result of the dye liquid crystal layer 3.

In the present examples, the at least one temperature sensor 4 is disposed between the first base substrate 11 and the second base substrate 21, but is not disposed on a surface of the first base substrate 11 away from the second substrate 2, or a surface of the second base substrate 21 away from the first base substrate 11 (i.e., an outside of the dimming glass 100).

By arranging the at least one temperature sensor 4 between the first base substrate 11 and the second base substrate 21, the at least one temperature sensor 4 and the dye liquid crystal layer 3 may be in a same environment. Compared with arranging the at least one temperature sensor 4 outside the dimming glass 100, in a process of detecting the temperature of the dye liquid crystal layer 3 by using the at least one temperature sensor 4, it is possible to avoid interference of an external ambient temperature, or avoid interference of a temperature of the first base substrate 11 or a temperature of the second base substrate 12. As a result, it is beneficial to improving the accuracy of the result detected by the at least one temperature sensor 4, and accurately reflecting a temperature state of the dye liquid crystal layer 3.

As such, as for the dimming glass 100 provided by some embodiments of the present disclosure, by arranging the dye liquid crystal layer 3 between the first substrate 1 and the second substrate 2, and arranging the at least one temperature sensor 4 for detecting the temperature of the dye liquid crystal layer 3 between the first base substrate 11 and the second base substrate 21, the accuracy of the result detected by the at least one temperature sensor 4 may be effectively improved. Moreover, in a case where the dimming glass is applied to the dimming glass system 1000, the controller 200 may obtain a more accurate detection signal from the at least one temperature sensor 4, so that the controller 200 may transmit more accurate driving voltages to the dye liquid crystal layer 3. This is beneficial to making the deflection states of the liquid crystal molecules at different positions of the dye liquid crystal layer 3 be the more ideal deflection states, and making the light transmittances at different positions of the dimming glass 100 be the more ideal light transmittances, thereby weakening or even eliminating the undesirable non-uniformity phenomenon of the dimming glass 100.

In the embodiments of the present disclosure, an arranging position of the at least one temperature sensor 4 may be various, and may be selected and set according to actual needs.

In some examples, the at least one temperature sensor 4 is disposed on a side of the first base substrate 11 proximate to the second base substrate 21, and/or the at least one temperature sensor 4 is disposed on a side of the second base substrate 21 proximate to the first base substrate 11.

As such, in a case where there is one temperature sensor 4, the temperature sensor 4 may be disposed on the side of the first base substrate 11 proximate to the second base substrate 21, or may be disposed on the side of the second base substrate 21 proximate to the first base substrate 11. In a case where there are a plurality of temperature sensors 4, the plurality of temperature sensors 4 may be all disposed on the side of the first base substrate 11 proximate to the second base substrate 21, or may be all disposed on the side of the second base substrate 21 proximate to the first base substrate 11. Or, a part of the plurality of temperature sensors 4 is disposed on the side of the first base substrate 11 proximate to the second base substrate 21, and the remaining part is disposed on the side of the second base substrate 21 proximate to the first base substrate 11.

In some embodiments, as shown in FIGS. 1 and 2, the dimming glass 100 has a main region Q1 and an edge region Q2 located at at least one side of the main region Q1.

A structure of the dimming glass 100 may be various, and the structure may be selected and designed according to actual needs.

In some examples, as shown in FIG. 1, a periphery of the dimming glass 100 has the edge region Q2. That is, the edge region Q2 surrounds the main region Q1.

In some other examples, as shown in FIG. 2, a part of the periphery of the dimming glass 100 has the edge region Q2, and the other part of the periphery has no edge region Q2. That is, the edge region Q2 does not surround the main region Q1. For example, the edge region Q2 is located at two opposite sides of the main region Q1. For another example, the edge region Q2 is located at two adjacent sides of the main region Q1. As also shown in FIG. 2, the edge region Q2 is located at multiple sides of the main region Q1.

In some embodiments, as shown in FIGS. 4 and 5, the dye liquid crystal layer 3 is located in the main region Q1, and the at least one temperature sensor 4 is located in the edge region Q2 of the dimming glass 100. By arranging the dye liquid crystal layer 3 and the at least one temperature sensor 4 in different regions, it is possible to prevent the dye liquid crystal layer 3 from adversely affecting working performance of the at least one temperature sensor 4.

In some examples, the at least one temperature sensor 4 is disposed in the edge region Q2 of the dimming glass 100, and there are a plurality of positions for arranging. The position for arranging is related to an ambient temperature where the dimming glass 100 is located.

For example, in a case where the ambient temperature where the dimming glass 100 is located is relatively uniform, temperatures at different positions of the dimming glass 100 are substantially the same. In this case, the at least one temperature sensor 4 may be disposed at any position in the edge region Q2.

For another example, in a case where the ambient temperature where the dimming glass 100 is located is not uniform, the temperatures at different positions of the dimming glass 100 vary greatly. In this case, at least a part of the at least one temperature sensor 4 may be disposed at a position with a high temperature in the edge region Q2 (e.g., a position with a highest temperature). In a case where the dimming glass 100 is applied to the dimming system 1000, after obtaining the detection signal of the at least one temperature sensor 4, the controller 200 transmits the driving voltages for controlling the dye liquid crystal layer 3 according to a detection signal corresponding to the highest temperature in the dimming glass 100. In this way, it may be ensured that the liquid crystal molecules at different positions of the dye liquid crystal layer 3 may rotate to the more ideal states, and further the light-absorbing ions at different positions are controlled to rotate to the more ideal states, so that the light transmittances at different positions of the dimming glass 100 are in more ideal states. Therefore, the non-uniformity defect of an entire dimming glass 100 may be effectively improved, and it is possible to avoid a situation where only the non-uniformity defect at partial positions is overcome.

In some embodiments, as shown in FIGS. 4 and 5, the dimming glass 100 further includes a sealant 5 disposed between the first substrate 1 and the second substrate 2. Herein, a material of the sealant 5 may be, for example, a material capable of transmitting light.

The sealant 5 surrounds the dye liquid crystal layer 3. In this way, the sealant 5 may keep the dye liquid crystal layer 3 in a confined space formed by the first substrate 1, the second substrate 2 and the sealant 5 while bonding the first substrate 1 and the second substrate 2, so as to protect the dye liquid crystal layer 3.

In some examples, as shown in FIGS. 4 and 5, at least a part of the sealant 5 is located between the dye liquid crystal layer 3 and the at least one temperature sensor 4. In this way, the dye liquid crystal layer 3 and the at least one temperature sensor 4 that are located in different regions may be separated by using the at least a part of the sealant 5, so as to prevent the dye liquid crystal layer 3 from entering the edge region Q2 and avoid affecting the working performance of the at least one temperature sensor 4.

In some examples, as shown in FIGS. 4 and 5, an orthographic projection of the at least a part of the sealant 5 on the first base substrate 11 overlaps with an orthographic projection of the at least one temperature sensor 4 on the first base substrate 11. That is, the at least a part of the sealant 5 partially or completely covers the at least one temperature sensor 4. In this way, the at least a part of the sealant 5 may protect the at least one temperature sensor 4, and the at least one temperature sensor 4 may be firmly bonded between the first base substrate 11 and the second base substrate 21.

In some embodiments, a type of the at least one temperature sensor 4 may be various, and the type may be selected and designed according to actual needs.

In some examples, the at least one temperature sensor 4 includes at least one of a positive temperature coefficient (abbreviated as PTC) thermistor and a negative temperature coefficient (abbreviated as NTC) thermistor. That is, in the case where there is one temperature sensor 4, the temperature sensor 4 may be the PTC thermistor or the NTC thermistor. In the case where there are a plurality of temperature sensors 4, the plurality of temperature sensors 4 may all be PTC thermistors, or may all be NTC thermistors. Or, a part of the plurality of temperature sensors 4 may be PTC thermistor(s), and the other part may be NTC thermistor(s).

Herein, a value of a resistance of the PTC thermistor will increase as the temperature rises, and a value of a resistance of the NTC thermistor will increase as the temperature decreases.

Figure 3:
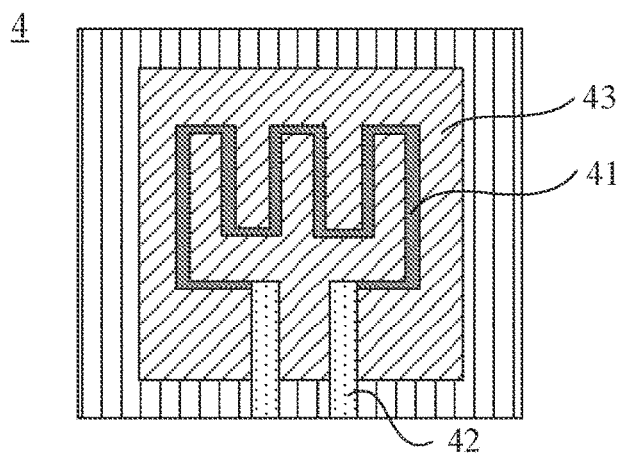
FIG. 3 is an enlarged view of the temperature sensor as shown in FIG. 2.

In some embodiments, as shown in FIGS. 3 to 5, each temperature sensor 4 of the at least one temperature sensor 4 includes: a conductive body 41 disposed on the first base substrate 11 or the second base substrate 21, a sensing electrode 42 electrically connected to the conductive body 41, and a protective layer 43 covering the conductive body 41 and the sensing electrode 42. The protective layer 43 is configured to protect the conductive body 41 and the sensing electrode 42, so as to prevent the conductive body 41 and the sensing electrode 42 from being damaged and avoid affecting the working performance of the temperature sensor 4.

In some examples, a material of the protective layer 43 includes an insulating material. The insulating material may be an inorganic insulating material, such as silicon nitride. The insulating material may also be an organic insulating material, such as a resin material.

In some examples, the conductive body 41 being disposed on the first base substrate 11 or the second base substrate 21 means that the conductive body 41 is disposed on a side of the first base substrate 11 proximate to the second substrate 2, or is disposed on a side of the second base substrate 21 proximate to the first substrate 1.

In some examples, the conductive body 41 is configured to detect the temperature of the dye liquid crystal layer 3. A material of the conductive body 41 includes a thermosensitive material. The thermosensitive material includes a thermistor alloy material, such as platinum-iridium alloy or nickel-chromium alloy.

Since the thermistor alloy material has a large resistivity and resistance temperature coefficient, the conductive body 41 may also have a large resistivity and resistance temperature coefficient. As a result, the value of the resistance of the conductive body 41 changes significantly with the temperature, which is beneficial to improving sensitivity of the temperature sensor 4.

In some examples, the controller 200 being electrically connected to the temperature sensor 4 means that the controller 200 is electrically connected to the sensing electrode 42 in the temperature sensor 4. The sensing electrode 42 is configured to transmit the detection signal generated by the conductive body 41, so that the controller 200 can obtain the detection signal generated by the conductive body 41 through the sensing electrode 42.

Each conductive body 41 may be electrically connected to a plurality of sensor electrodes 42. For example, as shown in FIG. 3, each conductive body 41 is electrically connected to two sensing electrodes 42.

A material of the sensing electrode 42 may be various. For example, the material of the sensing electrode 42 includes a transparent conductive material, such as ITO that has high light transmittance. Since ITO has a high conductivity, the sensing electrode 42 formed by ITO may not only avoid affecting the light transmittance of the dimming glass 100, but also ensure transmission efficiency of the detection signal of the sensing electrode 42.

In some embodiments, the material of the sensing electrode 42 in each sensor 4 includes the transparent conductive material, and the material of the first dimming electrode 12 and the material of the second dimming electrode 22 also include the transparent conductive material. In this way, in a case where the temperature sensor 4 is disposed on the first base substrate 11, the sensing electrode 42 and the first dimming electrode 12 may be made of a same material (e.g., ITO) and disposed in a same layer; and in a case where the temperature sensor 4 is disposed on the second substrate 2, the sensing electrode 42 and the second dimming electrode 22 may be made of a same material (e.g., ITO) and disposed in a same layer.

The "same layer" mentioned herein refers to a layer structure with specific patterns, which is formed by first forming a film by using a same film-forming process and then performing a patterning process on the film by using a same mask. Depending on different specific patterns, the patterning process may include multiple exposure, development or etching processes. The specific patterns of the formed layer structure may be continuous or discontinuous, and these specific patterns may also be at different heights or have different thicknesses. In this way, in the case where the temperature sensor 4 is disposed on the first base substrate 11, the sensing electrode 42 and the first dimming electrode 12 may be formed synchronously; and in the case where the temperature sensor 4 is disposed on the second substrate 2, the sensing electrode 42 and the second dimming electrode 22 may be formed synchronously. This is beneficial to reducing a thickness of the dimming glass 100, and simplifying the manufacturing process of the dimming glass 100.

It will be seen from the structure of the temperature sensor 4 that, in the present disclosure, the temperature sensor 4 is integrated in the dimming glass 100, and is in the same environment as the dye liquid crystal layer 3, instead of being bonded to an inside or the outside of the dimming glass 100. In this way, it is possible to avoid a problem of an inaccurate result of the detection signal of the temperature sensor 4 caused by untight bonding, and it is possible to avoid a situation where the temperature sensor 4 falls off due to a fact that the dimming glass 100 is in a severe environment such as large environmental temperature differences, large humidity changes, or sunlight exposure. Moreover, in a case where the dimming glass 100 is applied into a hollow glass, compared with arranging the temperature sensor 4 outside the dimming glass 100, it is beneficial to reducing manufacturing difficulty.

Figure 6:
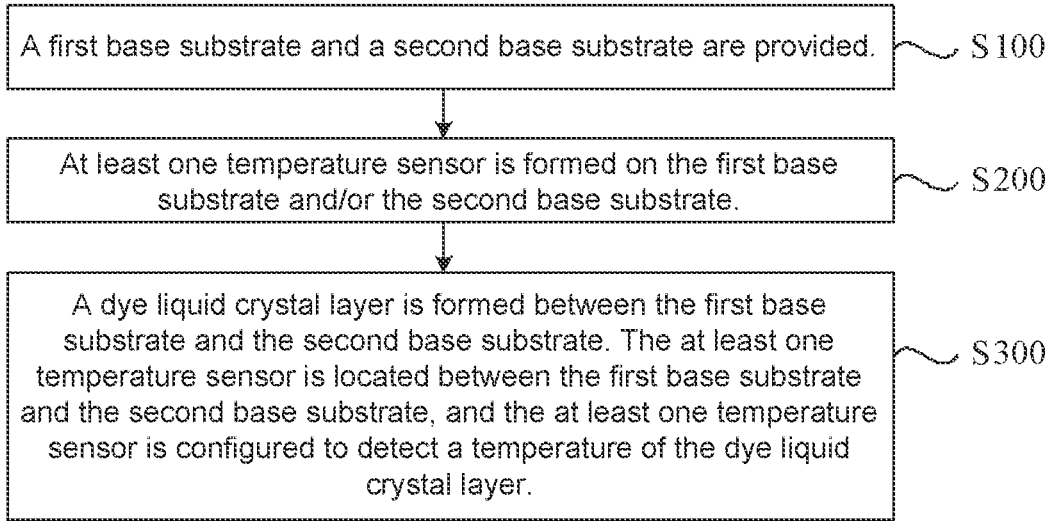
FIG. 6 is a flow diagram of a method of manufacturing a dimming glass, in accordance with some embodiments of the present disclosure.

Some embodiments of the present disclosure provide a method of manufacturing a dimming glass. As shown in FIG. 6, the method includes S100 to S300.

In S100, a first substrate 1 and a second substrate 2 are prepared.

In some examples, in S100, preparing the first substrate 1 includes S110a to S130a.

In S110a, a first base substrate 11 is provided.

Figure 8:
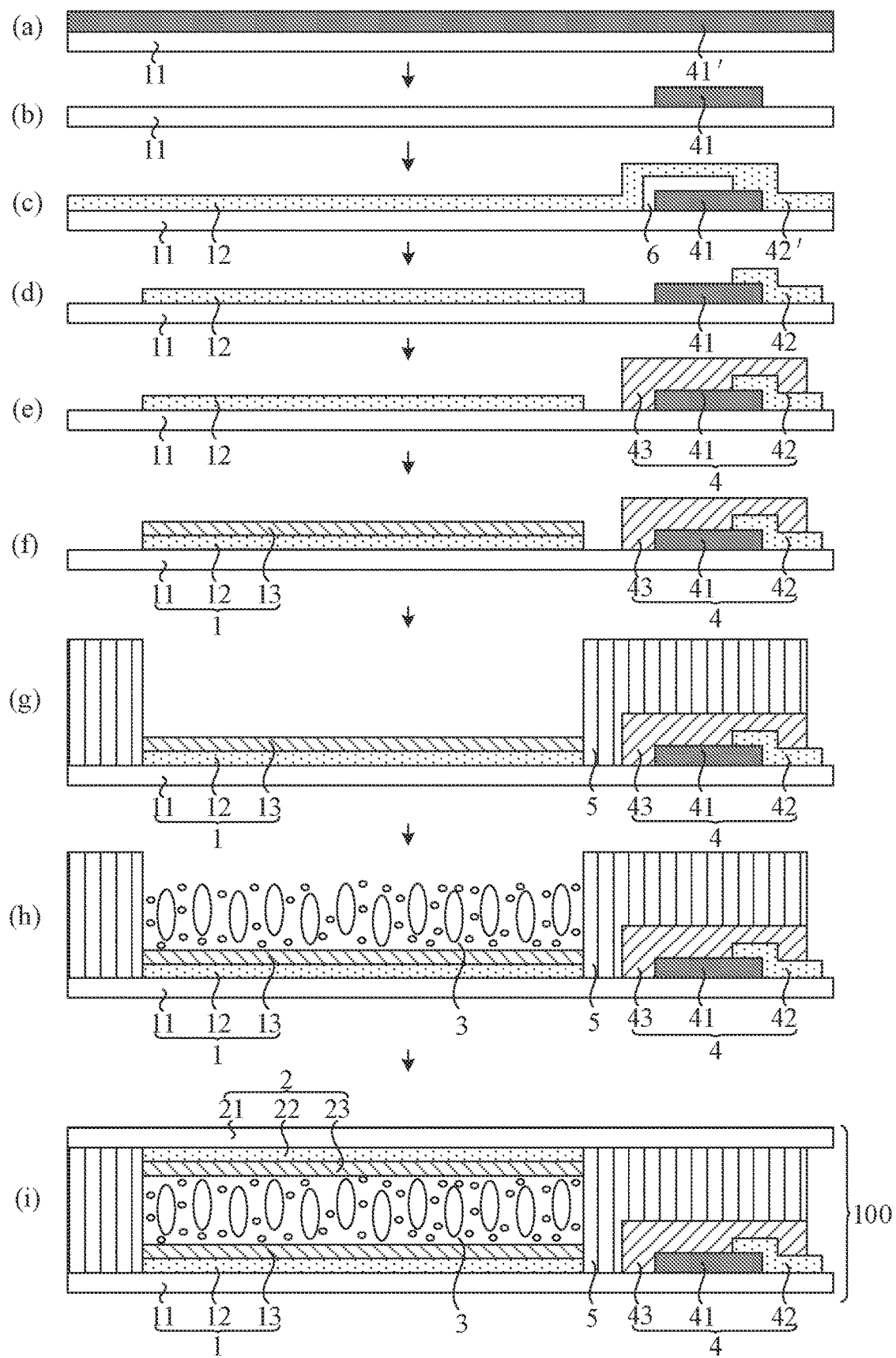
FIG. 8 is a diagram showing a manufacturing process of a dimming glass, in accordance with some embodiments of the present disclosure.

In S120a, as shown in part (d) in FIG. 8, a first transparent conductive material thin film is formed on a side of the first base substrate 11, and the first transparent conductive material thin film is patterned to form a first dimming electrode 12.

For example, the first transparent conductive material thin film may be formed through a sputtering process, a deposition process, or an evaporation process, and the first transparent conductive material thin film may be patterned through a photolithography process.

In S130a, as shown in part (f) in FIG. 8, a first alignment thin film is formed on a side of the first dimming electrode 12 away from the first base substrate 11, and the first alignment thin film is cured to form a first alignment film 13.

Herein, as for materials of the first base substrate 11, the first dimming electrode 12 and the first alignment film 13, reference may be made to related contents in some embodiments described above.

In some examples, in S100, preparing the first substrate 2 includes S110b to S130b.

In S110b, a second base substrate 21 is provided.

In S120b, a second transparent conductive material thin film is formed on a side of the second base substrate 21, and the second transparent conductive material thin film is patterned to form a second dimming electrode 22.

For example, the second transparent conductive material thin film may be formed through a sputtering process, a deposition process, or an evaporation process, and the second transparent conductive material thin film may be patterned through a photolithography process.

In S130b, a second alignment thin film is applied and formed on a side of the second dimming electrode 22 away from the second base substrate 21, and the second alignment thin film is cured to form a second alignment film 23.

Herein, as for materials of the second base substrate 21, the second dimming electrode 22 and the second alignment film 23, reference may be made to related contents in some embodiments described above. A flow diagram of forming the second dimming electrode 22 and the second alignment film 23 may refer to the flow diagram shown in FIG. 8.

In S200, at least one temperature sensor 4 is formed on the first base substrate 11 and/or the second base substrate 21.

The at least one temperature sensor 4 may be formed on the first base substrate 11 or the second base substrate 21, or may be formed on both the first base substrate 11 and the second base substrate 21.

For example, as shown in the parts (a) to (e) in FIG. 8, that the at least one temperature sensor 4 is formed on the first base substrate 11 is taken as an example. After the at least one temperature sensor 4 is formed on the first base substrate 11, it is located at a same side of the first base substrate 11 as the first alignment film 13.

In S300, as shown in parts (h) and (i) in FIG. 8, a dye liquid crystal layer 3 is formed between the first base substrate 11 and the second base substrate 21. The at least one temperature sensor 4 is located between the first base substrate 11 and the second base substrate 21, and the at least one temperature sensor 4 is configured to detect a temperature of the dye liquid crystal layer 3.

In some examples, as shown in part (g) in FIG. 8, before S300, the method of manufacturing the dimming glass further includes: forming a sealant 5 between the first substrate 1 and the second substrate 2. The sealant 5 surrounds the dye liquid crystal layer 3, and at least a part of the sealant 5 is located between the dye liquid crystal layer 3 and the at least one temperature sensor 4.

In some examples, in S300, there are a plurality of ways of forming the dye liquid crystal layer 3 between the first substrate 1 and the second substrate 2. The way of forming the dye liquid crystal layer 3 is related to a position where the sealant 5 is formed.

For example, as shown in the parts (g) to (i) in FIG. 8, the sealant 5 is formed on a side of one of the first substrate 1 and the second substrate 2, and the sealant 5 has a closed loop structure (e.g., a square loop or a circular loop). In this case, dye liquid crystals may be applied or dropped in a region enclosed by the sealant 5, and then the other of the first substrate 1 and the second substrate 2 is placed on a side of the dye liquid crystals and bonded to the sealant 5. In this way, the dye liquid crystals are formed as the dye liquid crystal layer 3, and the dye liquid crystal layer 3 is located between the first substrate 1 and the second substrate 2. Herein, the dye liquid crystal layer 3 and the at least one temperature sensor 4 are located at both sides of the sealant 5 to prevent the dye liquid crystals from flowing to the position where the at least one temperature sensor 4 is located.

For example, the sealant 5 is formed between the first substrate 1 and the second substrate 2, so that the first substrate 1 and the second substrate 2 are bonded together through the sealant 5 to form a cavity. The sealant 5 is provided with an opening, and has an unclosed loop structure (e.g., a square loop or a circular loop). In this case, the dye liquid crystals may fill a space between the first substrate 1 and the second substrate 2 through the opening, and then the opening is closed. In this way, the dye liquid crystals are formed as the dye liquid crystal layer 3, and the dye liquid crystal layer 3 is located between the first substrate 1 and the second substrate 2. Herein, after the sealant 5 is formed, the at least one temperature sensor 4 is located outside the cavity, so that the formed dye liquid crystal layer 3 and the at least one temperature sensor 4 are located at both sides of the sealant 5, which may prevent the dye liquid crystals from flowing to the position where the at least one temperature sensor 4 is located.

Herein, the dye liquid crystal layer 3 is located between the first base substrate 11 and the second base substrate 21. Furthermore, the dye liquid crystal layer 3 is located between the first alignment film 13 and the second alignment film 23. In this way, after the dye liquid crystal layer 3 is formed, the at least one temperature sensor 4 formed on the first base substrate 11 and/or the second base substrate 21 is also located between the first base substrate 11 and the second base substrate 21.

In some examples, as shown in the part (g) in FIG. 8, an orthographic projection of the sealant 5 on the first base substrate 11 overlaps with an orthographic projection of the at least one temperature sensor 4 on the first base substrate 11. In this way, the first substrate 1 and the second substrate 2 may be bonded through the sealant 5, and the at least one temperature sensor 4 may be firmly bonded between the first base substrate 11 and the second base substrate 21 through the sealant 5, so as to prevent the at least one temperature sensor 4 from being separated from the first base substrate 11 and the second base substrate 21.

Beneficial effects that the method of manufacturing the dimming glass provided by some embodiments of the present disclosure can achieve are the same as those that the dimming glass 100 provided by some embodiments can achieve, which will not be repeated herein.

It will be noted that, the above reference signs (e.g., S110a to S130a, S110b to S130b or S100 to S300) of the steps are only used to describe contents of the steps clearly, and are not to limit a sequence of the steps for manufacturing the dimming glass 100, and the sequence of the steps for manufacturing the dimming glass 100 may be set according to actual needs.

Figure 7:
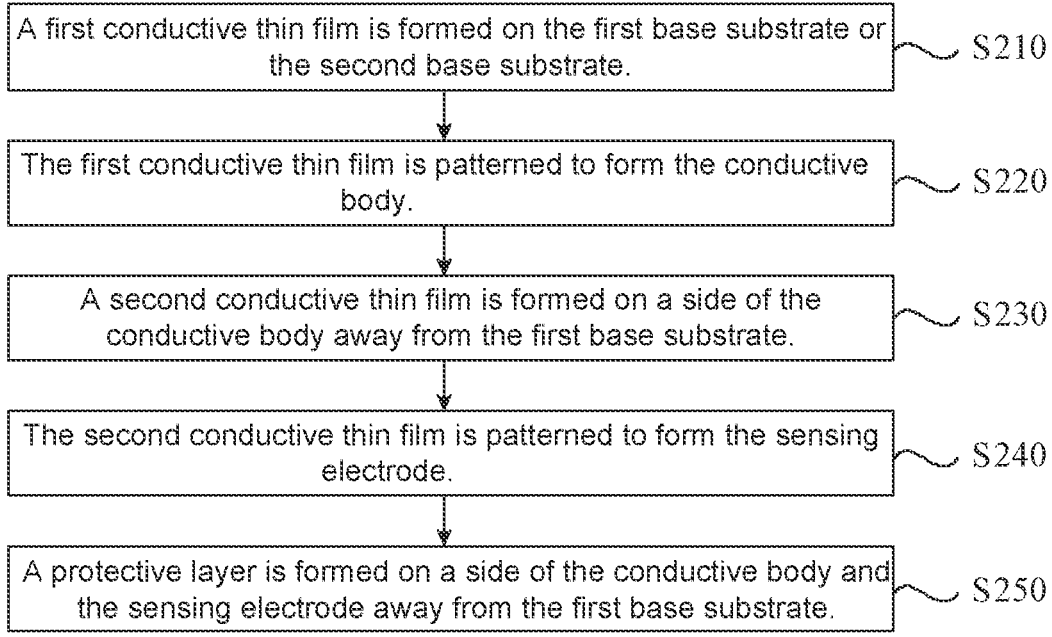
FIG. 7 is a flow diagram of a method of manufacturing a temperature sensor, in accordance with some embodiments of the present disclosure.

In some embodiments, each temperature sensor 4 of the at least one temperature sensor 4 includes: a conductive body 41, a sensing electrode 42 electrically connected to the conductive body 41, and a protective layer 43 covering the conductive body 41 and the sensing electrode 42. As shown in FIG. 7, forming the at least one temperature sensor 4 includes S210 to S250.

In S210, a first conductive thin film 41' is formed on the first base substrate 11 or the second base substrate 21.

For example, the first conductive thin film 41' may be formed through a sputtering process, a deposition process, or an evaporation process. A material of the first conductive thin film 41' may be platinum-iridium alloy, nickel-chromium alloy or the like.

In S220, as shown in part (b) in FIG. 8, the first conductive thin film 41' is patterned to form the conductive body 41.

For example, in S220, forming the conductive body 41 includes: applying a photoresist on a side of the first conductive thin film 41' away from the first base substrate 11, and patterning the photoresist through a photolithography process; and etching the first conductive thin film 41' by using the patterned photoresist as a mask through a wet etching process or a dry etching process to form the conductive body 41.

In S230, as shown in part (c) in FIG. 8, a second conductive thin film 42' is formed at a side of the conductive body 41 away from the first base substrate 11.

For example, the second conductive thin film 42' may be formed through a sputtering process, a deposition process, or an evaporation process. A material of the second conductive thin film 42' may be ITO.

In some examples, before S230, a conductive body protective layer 6 (e.g., a photoresist layer) is formed on a surface of the conductive body 41 facing away from the first base substrate 11. The conductive body protective layer 6 exposes a portion of the conductive body 41 that is used for electrical connection with the subsequently formed sensing electrode 42. By providing the conductive body protection layer 6 on the surface of the conductive body 41 facing away from the first base substrate 11, the conductive body 41 may be protected, and the conductive body 41 may be prevented from being contaminated and damaged in a subsequent process of forming the sensing electrode 42.

In S240, as shown in the part (d) in FIG. 8, the second conductive thin film 42' is patterned to form the sensing electrode 42.

For example, in S240, forming the sensing electrode 42 includes: applying a photoresist on a side of the second conductive thin film 42' away from the first base substrate 11, and patterning the photoresist through a photolithography process; and etching the second conductive thin film 42' by using the patterned photoresist as a mask through a wet etching process or a dry etching process to form the sensing electrode 42. After the sensing electrode 42 is formed, the patterned photoresist and the conductive body protective layer 6 are removed.

In S250, as shown in the part (e) in FIG. 8, a protective layer 43 is formed on a side of the conductive body 41 and the sensing electrode 42 away from the first base substrate 11.

For example, the protective layer 43 is formed through a plasma enhanced chemical vapor deposition (abbreviated as PECVD) process. A material of the protective layer 43 may include silicon nitride ($SiN_x$).

In some embodiments, as shown in the parts (c) and (d) in FIG. 8, in a case where the temperature sensor 4 is disposed on the first base substrate 11, and the material of the first dimming electrode 12 in the first substrate 1 is the same as a material of the sensing electrode 42, the first transparent conductive material thin film in S120a is the second conductive thin film 42' in S230. In this way, when the second conductive thin film 42' is patterned to form the sensing electrode 42 in S240, the first dimming electrode 12 is formed synchronously. That is, the sensing electrode 42 and the first dimming electrode 12 are formed through one patterning process. This is beneficial to reducing a thickness of the dimming glass 100, and simplifying a manufacturing process of the dimming glass 100.

In some other embodiments, in a case where the temperature sensor 4 is disposed on the second base substrate 21, and the material of the second dimming electrode 22 in the second substrate 2 is the same as the material of the sensing electrode 42, the second transparent conductive material thin film in S120b is the second conductive thin film 42' in S230. In this way, when the second conductive thin film 42' is patterned to form the sensing electrode 42 in S240, the second dimming electrode 22 is formed synchronously. That is, the sensing electrode 42 and the second dimming electrode 22 are formed through one patterning process. This is beneficial to reducing the thickness of the dimming glass 100, and simplifying the manufacturing process of the dimming glass 100. Herein, reference may be made to the flow diagram shown in the parts (c) and (d) in FIG. 8.

Figure 11:
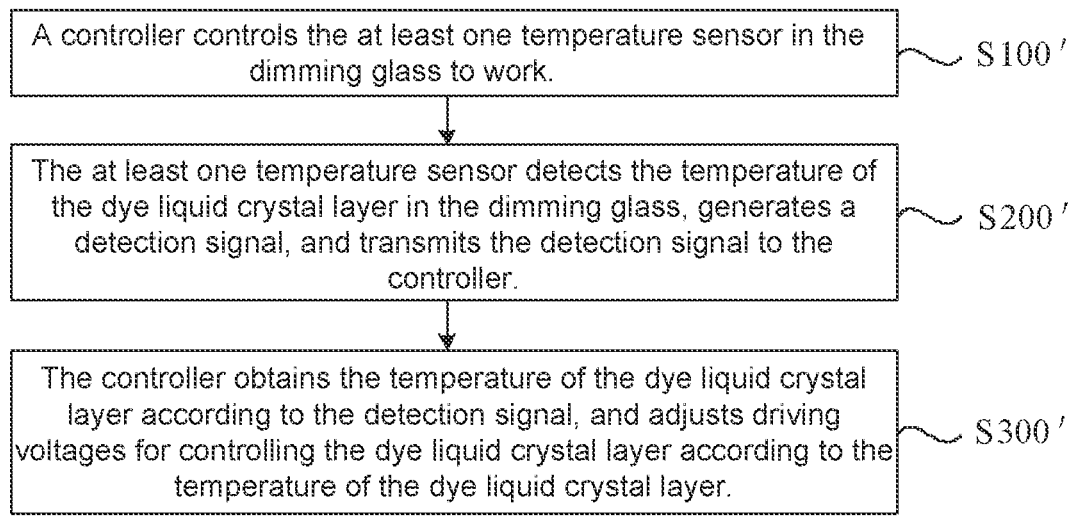
FIG. 11 is a flow diagram of a method of driving a dimming glass system, in accordance with some embodiments of the present disclosure.

Some embodiments of the present disclosure provide a method of driving a dimming glass system. The driving method is applied to the dimming glass system 1000 provided by some embodiments described above. As shown in FIG. 11, the driving method includes S100' to S300'.

In S100', a controller controls the at least one temperature sensor in the dimming glass to work.

In S200', the at least one temperature sensor detects the temperature of the dye liquid crystal layer in the dimming glass, generates a detection signal, and transmits the detection signal to the controller.

After the dimming glass system starts to work, the controller may control the at least one temperature sensor to start to work, i.e., starting to detect the temperature of the dye liquid crystal layer. For example, the at least one temperature sensor may be made to start to work by providing a working voltage to the at least one temperature sensor.

In some examples, in a process of detecting the temperature of the dye liquid crystal layer, the at least one temperature sensor may detect the temperature of the dye liquid crystal layer in real time or it may detect the temperature of the dye liquid crystal layer in time intervals (e.g., detecting the temperature of the dye liquid crystal layer every one minute). A time interval between two adjacent detections of the temperature of the dye liquid crystal layer may be selected and set according to actual needs.

In some examples, the temperature sensor includes a conductive body made of a thermosensitive material, and its resistance value is sensitive to temperature changes. In this way, after detecting the temperature of the dye liquid crystal layer, the temperature sensor may generate a detection signal with an obvious change. The detection signal may be transmitted to the controller through the sensing electrode in the temperature sensor.

In S300', the controller obtains the temperature of the dye liquid crystal layer according to the detection signal, and adjusts driving voltages for controlling the dye liquid crystal layer according to the temperature of the dye liquid crystal layer. The driving voltages are, for example, alternating voltages.

Figure 10:
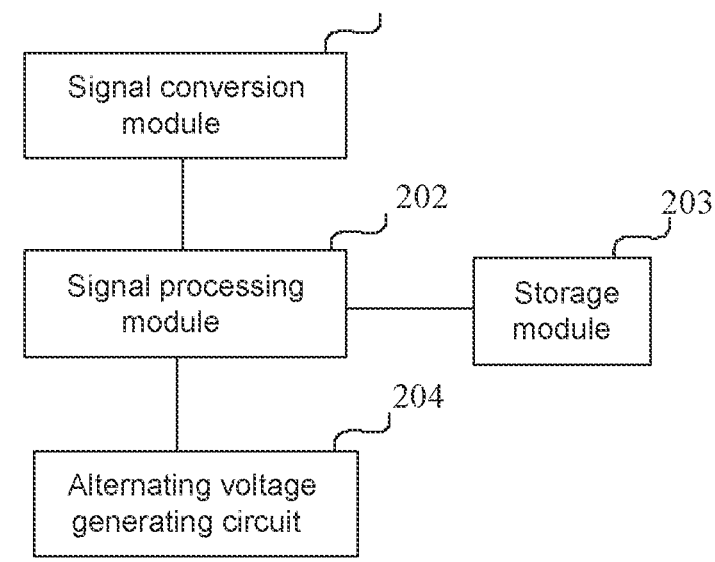
FIG. 10 is a diagram showing a structure of a controller, in accordance with some embodiments of the present disclosure.

As shown in FIGS. 9 and 10, in the dimming glass system 1000 provided by the embodiments of the present disclosure, the controller 200 has various structures.

For example, as shown in FIG. 10, the controller 200 includes: a signal conversion module 201, a signal processing module 202 connected to the signal conversion module 201, a storage module 203 connected to the signal processing module 202, and an alternating voltage generating circuit 204 connected to the signal processing module 202. A connection of the modules may be an electrical connection or a signal connection.

Herein, the signal conversion module 201 is configured to obtain the detection signal of the at least one temperature sensor 4, and convert the detection signal into a temperature. The storage module 203 is configured to store a mapping table of the temperature and the driving voltages. The signal processing module 202 is configured to obtain the temperature converted by the signal conversion module 201, call the mapping table stored in the storage module 203, and find the driving voltages corresponding to the temperature from the mapping table. The alternating voltage generating circuit 204 is configured to obtain the driving voltages found by the signal processing module 202, generate the corresponding driving voltages, and transmit the driving voltages to the dye liquid crystal layer 3 of the dimming glass 100.

A process of adjusting the driving voltages by the controller will be schematically described below.

For example, after obtaining the detection signal (which is usually an electrical signal), the controller may first convert the detection signal into a temperature. After obtaining the temperature, the controller may obtain the driving voltages corresponding to the temperature according to the mapping table of the temperature and the driving voltages. Then, the controller may transmit the driving voltages to the dimming glass to control the deflection of the liquid crystal molecules in the dye liquid crystal layer, which may drive the light-absorbing ions to rotate.

Herein, the mapping table of the temperature and the driving voltages includes: a correspondence among the temperature, values of the driving voltages, frequencies of the driving voltages, and the light transmittance. The mapping table may be determined through multiple tests in advance.

It will be seen from the above that, the light transmittance of the dimming glass is related to the values of the driving voltages and/or the frequencies of the driving voltages. That is, the deflection angle of the liquid crystal molecules in the dye liquid crystal layer is related to the values of the driving voltages and/or the frequencies of the driving voltages. In this way, the light transmittance may be adjusted by dynamically adjusting the values of the driving voltages and/or the frequencies of the driving voltages.

In some examples, in S300', adjusting the driving voltages for controlling the dye liquid crystal layer according to the temperature of the dye liquid crystal layer, includes: adjusting the values of the driving voltages, and/or adjusting the frequencies of the driving voltages.

For example, in a working process of the dye liquid crystal layer, the deflection angle of the liquid crystal molecules will increase as the values of the driving voltages increase. In this way, in a case where the values of the driving voltages decrease, the deflection angle of the liquid crystal molecules may be reduced. In addition, in a case where the frequencies of the driving voltages do not change, the liquid crystal molecules are inverted at a certain frequency. In this way, in a case where the values of the driving voltages do not change, increasing the frequencies of the driving voltages is equivalent to providing reverse voltages to the liquid crystal molecules in advance, so that the liquid crystal molecules are inverted before rotating to a maximum deflection angle, which may reduce the deflection angle of the liquid crystal molecules. Herein, the maximum deflection angle refers to a deflection angle that the liquid crystal molecules can reach under action of the values of the driving voltages.

As a result, in a case where the undesired non-uniformity phenomenon of the dimming glass occurs, the deflection angle of the liquid crystal molecules in the dye liquid crystal layer may be reduced by reducing the values of the driving voltages and/or increasing the frequencies of the driving voltages, thereby reducing the rotation angle of the light-absorbing ions in the dye liquid crystal layer, improving light-absorbing efficiency of the light-absorbing ions, reducing an amount of light passing through the dimming glass, and effectively improving or even eliminating the undesired non-uniformity phenomenon.

A relationship between the light transmittance of the dimming glass and the driving voltages will be schematically described below.

For example, a size of the dimming glass is 13.2 inches, a thickness of the dye liquid crystal layer (i.e., a dimension of the dye liquid crystal layer in a direction perpendicular to the first substrate in the dimming glass) is 25 µm, a maximum value of the driving voltages of the controller is 22 V, and the temperature of the dye liquid crystal layer is 80° C.

Figure 12:
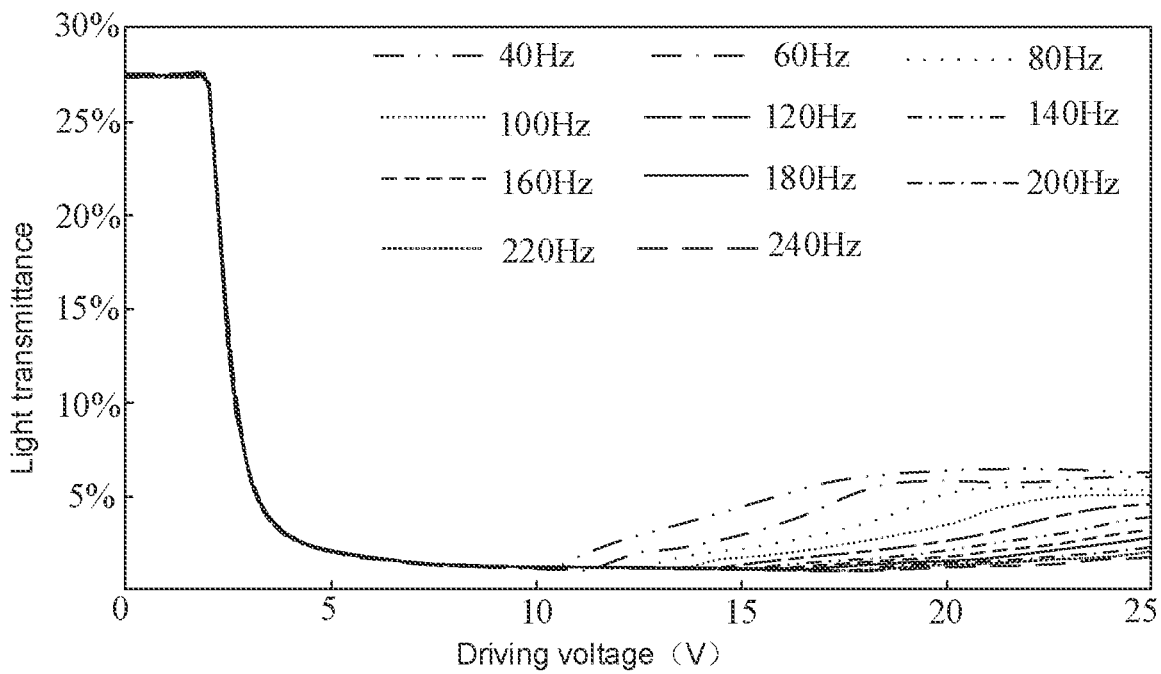
FIG. 12 is a graph showing a change of a light transmittance of a dimming glass system with driving voltages, in accordance with some embodiments of the present disclosure.

As shown in FIG. 12, the rise of the curve that occurs after the driving voltages are greater than 10 V in the figure indicates that the light transmittance of the dimming glass abnormally increases and the undesired non-uniformity phenomenon occurs.

It will be seen from the figure that, under a same temperature and driving voltages with a same frequency, the lower the values of the driving voltages are, the less likely the undesired non-uniformity phenomenon of the dimming glass occurs. For example, in a case where the frequency of the driving voltages is 60 Hz, and the values of the driving voltages range from 12 V to 20 V, the light transmittance of the dimming glass decreases as the values of the driving voltages decrease. Under the same temperature and driving voltages with a same value, the higher the frequencies of the driving voltages are, the less likely the undesired non-uniformity phenomenon of the dimming glass occurs. For example, in a case where the value of the driving voltages is 20 V, the light transmittance of the dimming glass decreases as the frequencies of the driving voltages increase.

Beneficial effects that the method of driving the dimming glass system provided by some embodiments of the present disclosure can achieve are the same as those that the dimming glass system provided by some embodiments described above can achieve, which will not be repeated herein.

In some embodiments, the dimming glass system 1000 mentioned in some embodiments described above may be applied to windows of buildings, automobiles, airplanes or the like.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:
1. A dimming glass, comprising:
a first base substrate and a second base substrate that are oppositely disposed;
a dye liquid crystal layer disposed between the first base substrate and the base second substrate; and
at least one temperature sensor disposed between the first base substrate and the second base substrate,
the at least one temperature sensor being configured to detect a temperature of the dye liquid crystal layer;
the dimming glass further comprising:
a first dimming electrode disposed on a side of the first base substrate;
a first alignment film disposed On a side of the first dimming electrode away from the first base substrate;

a second dimming electrode disposed on a side of the second base substrate proximate to the first base substrate; and a second alignment film disposed on a side of the second dimming electrode proximate to the first base substrate;

a temperature sensor of the at least one temperature sensor is disposed on one of the first base substrate and the second base substrate;

in a case where the temperature sensor is disposed on the first base substrate and the temperature sensor includes a sensing electrode, the sensing electrode and the first dimming electrode are made of a same material and are disposed in a same layer; and in a case where the temperature sensor is disposed on the second base substrate and the temperature sensor includes the sensing electrode, the sensing electrode and the second dimming electrode are made of a same material and are disposed in a same layer.

2. The dimming glass according to claim 1, wherein the at least one temperature sensor is disposed on a side of the first base substrate proximate to the second base substrate, or the at least one temperature sensor is disposed on a side of the second base substrate proximate to the first base substrate.

3. The dimming glass according to claim 1, wherein the dimming glass has a main region and an edge region located at at least one side of the main region; and the dye liquid crystal layer is located in the main region; and the at least one temperature sensor is located in the edge region of the dimming glass.

4. The dimming glass according to claim 1, wherein the at least one temperature sensor includes at least one of a positive temperature coefficient thermistor and a negative temperature coefficient thermistor.

5. The dimming glass according to claim 1, wherein each temperature sensor includes:

a conductive body disposed on the first base substrate or the second base substrate, a material of the conductive body including a thermosensitive material;

a sensing electrode electrically connected to the conductive body; and a protective layer covering the conductive body and the sensing electrode.

6. The dimming glass according to claim 1, wherein each temperature sensor includes a sensing electrode, and a material of the sensing electrode, a material of the first dimming electrode and a material of the second dimming electrode all include a transparent conductive material.

7. The dimming glass according to claim 1, further comprising a sealant disposed between the first base substrate and the second base substrate, the sealant surrounding the dye liquid crystal layer, and at least a part of the sealant being located between the dye liquid crystal layer and the at least one temperature sensor.

8. A dimming glass system, comprising:

the dimming glass according to claim 1; and a controller electrically connected to the at least one temperature sensor in the dimming glass, the controller being configured to control the at least one temperature sensor to detect the temperature of the dye liquid crystal layer in the dimming glass, obtain a detection signal of the at least one temperature sensor, and transmit driving; voltages for controlling the dye liquid crystal layer to the dimming glass according to the detection signal.

* * * * *